United States Patent
Simpson et al.

(10) Patent No.: US 7,481,182 B2
(45) Date of Patent: Jan. 27, 2009

(54) PET LITTER PAN ENCLOSURE

(75) Inventors: Jeffrey M. Simpson, 381 Oak Ridge Dr., Auburn, AL (US) 36830; Mark A. Haley, Asheville, NC (US)

(73) Assignee: Jeffrey M. Simpson, Auburn, AL (US)

( * ) Notice: Subject to any disclaimer, the term of this patent is extended or adjusted under 35 U.S.C. 154(b) by 394 days.

(21) Appl. No.: 10/829,606

(22) Filed: Apr. 22, 2004

(65) Prior Publication Data

US 2004/0244716 A1 Dec. 9, 2004

Related U.S. Application Data

(60) Provisional application No. 60/465,119, filed on Apr. 24, 2003.

(51) Int. Cl.
*A01K 1/01* (2006.01)
*A01K 1/03* (2006.01)
*A01K 29/00* (2006.01)

(52) U.S. Cl. ............... 119/168; 119/479; 119/474; 119/498

(58) Field of Classification Search .......... 119/165, 119/162, 161, 416, 452, 453, 472, 474, 496, 119/498, 168, 461, 462, 479, 482, 499, 501, 119/705, 706, 28.5; D30/108, 109, 161
See application file for complete search history.

(56) References Cited

U.S. PATENT DOCUMENTS

| 627,535 | A | * | 6/1899 | Schichtl ............... 217/47 |
| 989,029 | A | | 4/1911 | Newcomb |
| 1,192,415 | A | * | 7/1916 | Giseke ............... 220/7 |
| 1,211,762 | A | | 1/1917 | Sawyer |
| 1,671,051 | A | * | 5/1928 | Soderquist ............... 220/6 |
| 2,789,531 | A | | 4/1957 | Diefendorf |
| 4,027,625 | A | | 6/1977 | Wheeler |
| D245,191 | S | | 7/1977 | Gore |
| 4,256,056 | A | | 3/1981 | Sou |
| 4,527,512 | A | | 7/1985 | Sugiura |
| 4,763,606 | A | | 8/1988 | Ondrasik, II |
| 4,803,951 | A | * | 2/1989 | Davis ............... 119/497 |
| D308,589 | S | | 6/1990 | Shay |
| D310,740 | S | | 9/1990 | Mannschreck |

(Continued)

FOREIGN PATENT DOCUMENTS

GB    2 238 296 A    5/1991

(Continued)

OTHER PUBLICATIONS

Machine Translation of JP10323139A.*

(Continued)

*Primary Examiner*—Son T. Nguyen
(74) *Attorney, Agent, or Firm*—Gardner Groff Greenwald & Villaueva, PC

(57) ABSTRACT

An enclosure for a pet litter pan, having a moisture and odor-resistant plastic rattan-like material woven on a wire frame. The enclosure is quickly and easily assembled from multiple panels using pin connectors and connector feet. An openable panel provides access to remove the litter pan for cleaning, and has low-friction rails along its interior for facilitating easier removal and replacement of the pan.

9 Claims, 4 Drawing Sheets

U.S. PATENT DOCUMENTS

| | | | |
|---|---|---|---|
| 5,249,549 A | 10/1993 | Rockaitis, III | |
| 5,282,542 A | 2/1994 | Mo | |
| D347,304 S | 5/1994 | Hellem | |
| 5,337,700 A | 8/1994 | Toft | |
| 5,452,681 A * | 9/1995 | Ho | 119/498 |
| 5,551,371 A * | 9/1996 | Markey et al. | 119/499 |
| D382,374 S | 8/1997 | Burks | |
| 5,669,331 A | 9/1997 | Richmond | |
| 5,699,754 A * | 12/1997 | Cahajla | 119/166 |
| 5,845,970 A | 12/1998 | Schwartz | |
| 5,931,326 A | 8/1999 | Weng | |
| 5,943,982 A | 8/1999 | Askins et al. | |
| 5,960,744 A | 10/1999 | Rutman | |
| 5,967,090 A | 10/1999 | Hui | |
| 6,062,169 A * | 5/2000 | Wade et al. | 119/165 |
| D426,684 S * | 6/2000 | Kenney | D30/161 |
| D427,730 S | 7/2000 | Powers et al. | |
| 6,131,534 A | 10/2000 | Axelrod | |
| 6,192,834 B1 | 2/2001 | Kolozsvari | |
| 6,230,915 B1 * | 5/2001 | Liu | 220/6 |
| 6,286,458 B1 * | 9/2001 | Rawson | 119/165 |
| 6,298,808 B1 * | 10/2001 | Crafton et al. | 119/165 |
| 6,318,294 B1 | 11/2001 | Richmond et al. | |
| 6,332,429 B1 * | 12/2001 | Gramlich | 119/165 |
| 6,354,245 B1 | 3/2002 | Roddy et al. | |
| 6,367,420 B1 * | 4/2002 | Tomlinson | 119/165 |
| D467,041 S | 12/2002 | Cortes-Reuter | |
| D473,351 S | 4/2003 | Critchley | |
| 6,601,723 B1 * | 8/2003 | Ziglar | 220/4.34 |
| D483,156 S * | 12/2003 | Simpson | D30/108 |
| D491,700 S | 6/2004 | Abajian | |
| D501,584 S | 2/2005 | Abajian | |
| 6,848,394 B1 * | 2/2005 | Sexton | 119/170 |

FOREIGN PATENT DOCUMENTS

| | | | |
|---|---|---|---|
| JP | 10323139 A * | 5/1997 | |
| WO | WO02/09502 A1 * | 2/2002 | |

OTHER PUBLICATIONS

In the Company of Dogs, Spring Preview 2001—Catalog, Portland, Tennessee.

* cited by examiner

PET LITTER PAN ENCLOSURE

CROSS-REFERENCE TO RELATED APPLICATIONS

This application claims priority to U.S. Provisional Patent Application Ser. No. 60/465,119, filed Apr. 24, 2003, and to U.S. Design patent application Ser. No. 29/180,465, filed Apr. 24, 2003. U.S. Provisional Patent Application Ser. No. 60/465,119 and U.S. Design patent application Ser. No. 29/180,465 are hereby incorporated herein by reference in their entireties for all purposes.

TECHNICAL FIELD

The present invention relates generally to the field of pet products, and more particularly to an enclosure for housing a litter pan for cats or other household pets.

BACKGROUND OF THE INVENTION

Millions of households in the United States and throughout the world keep domesticated cats and other pets indoors, requiring the use of litter pans to collect the pets' waste. These pans are typically partially filled with a litter mix of clay, sawdust, silica gel, and/or other ingredients for absorbing liquids and masking odors. The litter pans must be periodically cleaned by the pet owner, for example by emptying the entire contents of the pan or scooping clumped waste from the litter, and re-filled with new litter mix.

Known litter pans typically comprise an open tub of molded plastic or the like. Hooded pans, which incorporate a hood or cover over a pan of typical design, are also known. Electronic "self-cleaning" pans are also known. One common problem with most known litter pans is that people generally consider them to be unattractive and not complementary to typical home décor. As a result, pet owners typically hide the litter pan in a bathroom, utility room or closet. Often, however, it would be desirable to locate the litter pan in a more visible location, for example for easier access by the pet, for easier or more frequent cleaning by the pet owner, due to space limitations, etc.

A further problem with many known hooded litter pans is the inconvenience and difficulty of cleaning. Typically, the hood must be unlatched, removed, and placed aside to access the litter for removal or cleaning. This process becomes all the more inconvenient for pet owners using "clumping" type litter mixes, which typically require more frequent cleaning.

Thus it can be seen that needs exist for improvement to litter pans and litter pan accessories, to provide a more attractive appearance that matches typical home décor, and provides easy and convenient access for cleaning and replacement of litter.

SUMMARY OF THE INVENTION

The present invention is an enclosure for a pet litter pan. In example embodiments, the enclosure of the present invention is attractive and complementary to a variety of home décor s. In further embodiments, the enclosure of the present invention allows easy and convenient access to the litter pan for use by the pet and for cleaning and replacement of litter by the pet owner. In still further embodiments, the enclosure of the present invention is fabricated from materials that do not absorb moisture or odors, and that resist damage and deterioration from moisture, mold, mildew and the like, and which is easily cleaned. In further embodiments, the enclosure of the present invention is collapsible for compact storage and shipping, and is easily assembled by one person without tools, or with only minimal commonly available assembly tools.

In one aspect, the present invention is an enclosure for a pet litter pan comprising a substantially rigid frame and a moisture-resistant plastic stranded material woven onto said frame to present the appearance of a rattan material.

In another aspect, the invention is an enclosure for housing a pet litter pan in an interior portion thereof, said enclosure comprising an openable panel having at least one rail along an interior face of said panel for sliding said litter pan thereon.

In still another aspect, the invention is an assembly comprising a first panel having a first post extending therefrom; a second panel having a second post extending therefrom; and at least one connector foot comprising a resilient material and at least one recess for receiving and engaging at least a portion of said first post and at least a portion of said second post to attach the first panel to the second panel.

In another aspect, the invention is a connector foot comprising a resilient material and at least one recess for receiving and engaging cooperating elements of at least two components for attaching the components together.

In yet another aspect, the invention is an enclosure for a litter pan having first and second side panels, a top panel, a back panel, and a front panel having an access opening defined therein. The enclosure preferably further includes four feet at base corners thereof, and a catch pan having notches for receiving each of those feet.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

Figure 1:
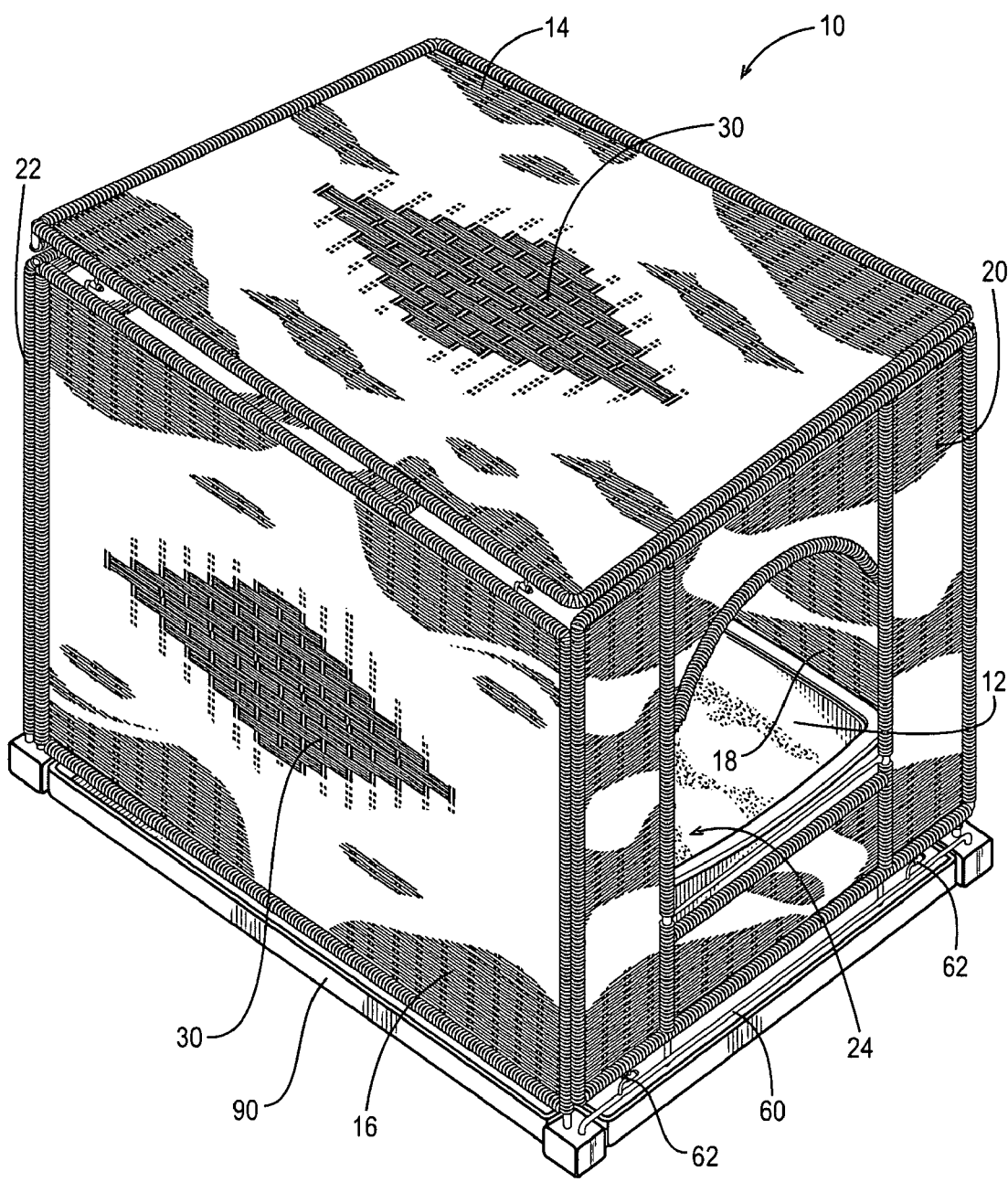
FIG. 1 shows a perspective view of a pet litter pan enclosure according to one example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, an enclosure 10 for a litter pan 12 is shown by way of an example embodiment of the present invention. The enclosure preferably generally comprises a top panel 14; first and second side panels 16, 18; a front panel 20; and a back panel 22. The front panel 20 preferably defines an opening 24 therein for access by a housecat or other pet of typical size. The bottom of the opening 24 is preferably at about the same height above the floor, or slightly higher than, the upper rim of a standard commercially available litter pan (about 3" to 7") when the enclosure 10 is in its assembled configuration as shown in FIG. 1.

Optionally, a removable catch pan 90 is provided, generally as shown in FIG. 1, to prevent any litter escaping the litter pan 12 from scattering onto the floor beneath and around the enclosure 10. The catch pan 90 is preferably a generally rectangular tray with four short-walled sides, upon which the litter pan 12 rests within the enclosure 10. Preferably, the corners of the catch pan 90 are notched with square or rectangular recesses or voids of a shape and size corresponding to those of the connector feet 50, such that when the enclosure is placed over the catch pan 90, the notches receive and engage the connector feet, and thereby prevent the catch pan 90 from moving or sliding out from beneath the enclosure. To remove the catch pan 90, and thus dispose of any litter that has spilled onto the tray, the enclosure 10 is lifted off of at least one side of the catch pan so that the catch pan can be slid or lifted out from under the enclosure. In an alternate embodiment, the enclosure 10 has an open bottom, so that the litter pan can be placed within the enclosure directly on the supporting floor or other surface underneath the enclosure during use, and cleanup of any litter escaping the pan is accomplished by sweeping or vacuuming.

The panels of the enclosure 10 are preferably fabricated as wire frames onto which are woven thermoplastic extruded resin strands having the appearance of natural rattan or wicker, which complements many décor schemes. The wire framing is optionally painted or coated with plastic for improved appearance and resistance to corrosion and discoloration. One or more of the panels may be woven with a decorative pattern or design 30 for improved aesthetics.

Figure 4A:
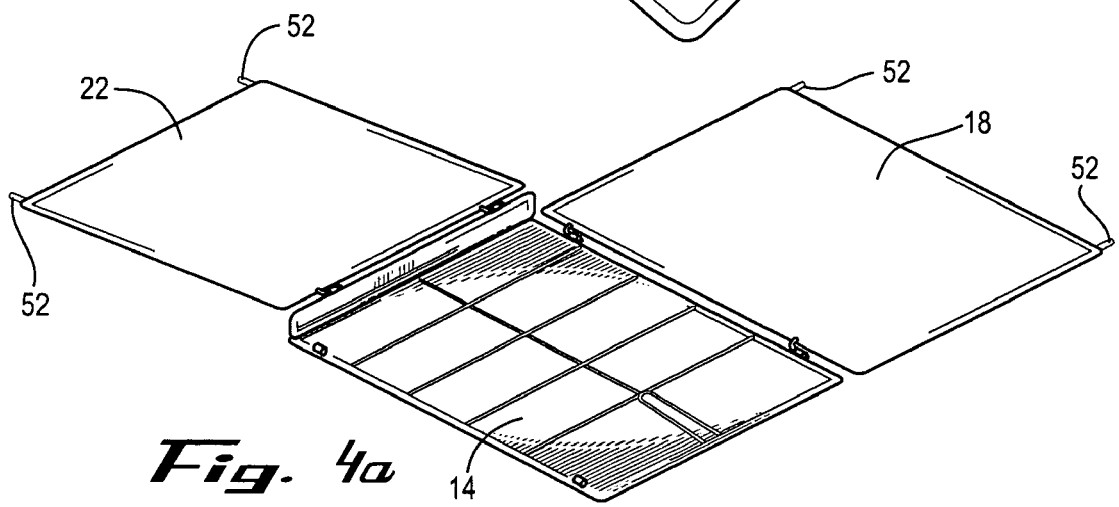
FIGS. 4a-4e show perspective views of steps in the assembly of the enclosure of FIG. 1.
Figure 4B:
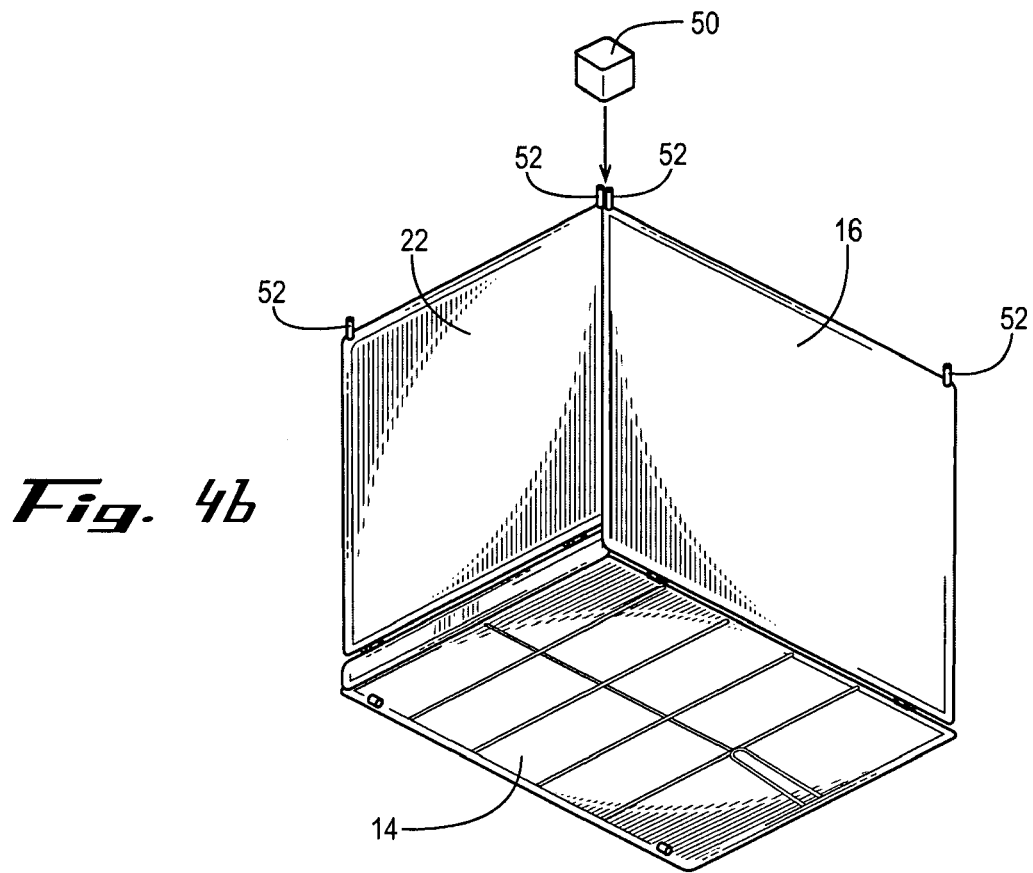
Figure 4C:
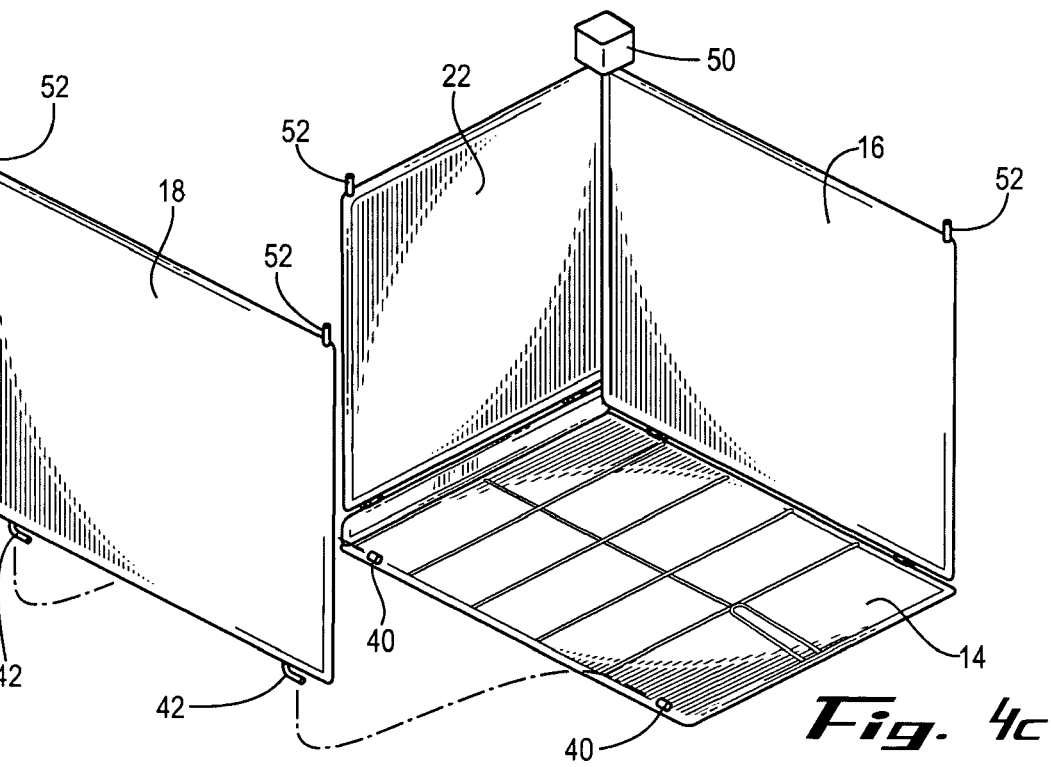

The enclosure 10 is preferably collapsible for easy and compact storage and transport, and easily and quickly assembled for use. Assembly of the enclosure 10 is preferably enabled without the necessity of tools, or with only commonly available household tools. FIGS. 2 and 4a-4e show steps in an example assembly sequence. As shown in FIGS. 4a-4c, the top panel 14 is preferably laid flat on the floor, and the side panels 16, 18, and the back panel 22 are attached thereto. Interengaging pin and ferrule connectors are preferably provided for connecting the side and back panels to the top panel. For example, and with particular reference to FIGS. 2 and 4c, the top panel 14 preferably comprises a pair of sleeves or ferrules 40 mounted on each side and on the back edge thereof, for receiving and engaging cooperating pairs of pins 42 mounted on the top edges of the side panels 16, 18 and the back panel 22. The pins 42 are preferably generally "L" or "C"-shaped hooks having one end attached to the frame of the panels, and a distal straight segment terminating at the pin's free end. Pin and ferrule couplings advantageously permit the panels to be connected to one another while laying flat on the floor, and then pivoted into their assembled positions, making it easier for one person to assemble the enclosure. Alternatively, the pins can be provided on the top panel, and the ferrules on the side and back panels. In other embodiments, screws, brackets, clamps, and/or other coupling means are provided for attaching the panels to one another. As seen best with reference to FIGS. 4c-4e, the front panel 20 and rear panel 22 extend across the full width of the top panel 14, so that when the enclosure 10 is assembled, the side panels 16, 18 are captive between the front panel and the rear panel and the pins 42 of the side panels cannot be inadvertently withdrawn from the respective ferrules of the top panel. The pins 42 that engage the side panels 16, 18 preferably have their free ends pointed toward the rear panel 22, such that the rear panel blocks the side panels from moving rearward and the hooked portion of the pins 42 blocks the side panels from moving forward when the enclosure is in its upright and assembled configuration, thereby providing substantial structural integrity to the assembly. In this manner, the enclosure is constrained in its assembled configuration without the need for nut-and-bolt connections or the like.

Figure 2:
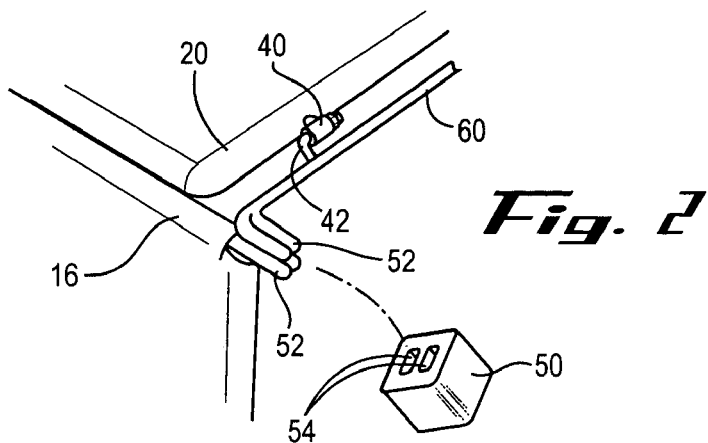
FIG. 2 shows a detailed view of a connector foot portion of the enclosure of FIG. 1 during assembly.
Figure 4D:
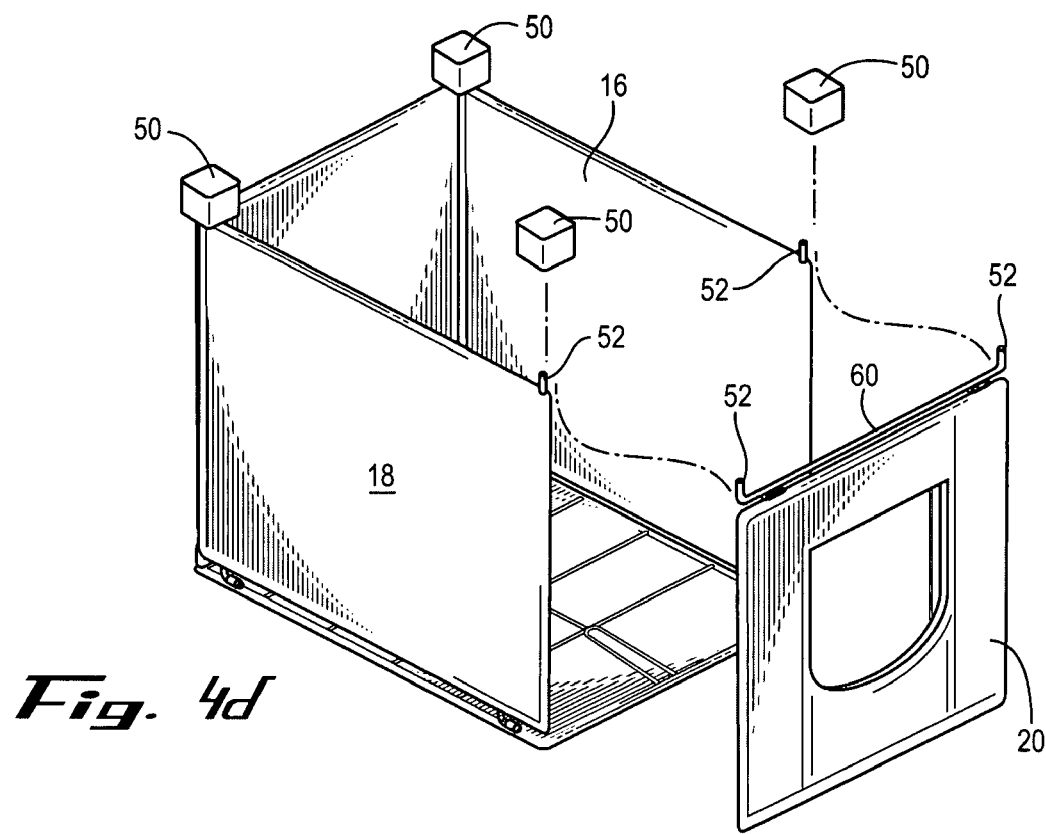

The enclosure 10 preferably further comprises one or more connector feet 50. The connector feet 50 are preferably formed of molded rubber, soft plastic, or other resilient material to resist sliding of the enclosure and prevent marring of floors when the enclosure is in use. In addition to supporting the enclosure 10, the connector feet 50 also serve to secure the panels in the assembled configuration of the enclosure. With particular reference to FIGS. 2, 4b and 4d, each of the side panels 16, 18, the front panel 20, and the back panel 22 comprise a post 52 projecting from each bottom corner, generally perpendicular to the bottom edge thereof. Each connector foot 50 preferably comprises a pair of recesses or channels 54 for receiving and engaging cooperating posts 52 of two adjacent panels to secure the panels to one another in the assembled configuration of the enclosure 10. The posts 52 are preferably slightly larger than the recesses 54, so that a tight friction fit secures the posts to the connector feet and prevents unintentional withdrawal of the posts from the recesses. The resilient material of the connector feet preferably allows the posts 52 to be pressed into the recesses 54 with moderate hand pressure. In a further preferred and optional embodiment, each post 52 comprises a doubled bend of the wire framing of the panel, or is otherwise formed to have a cross section longer than it is wide; and each recess 54 in the connector foot 50 has a corresponding shape, thereby preventing twisting of the posts 52 within the connector feet 50, and resisting misalignment of the panels, providing a more sturdy and stable final assembly.

Figure 3:
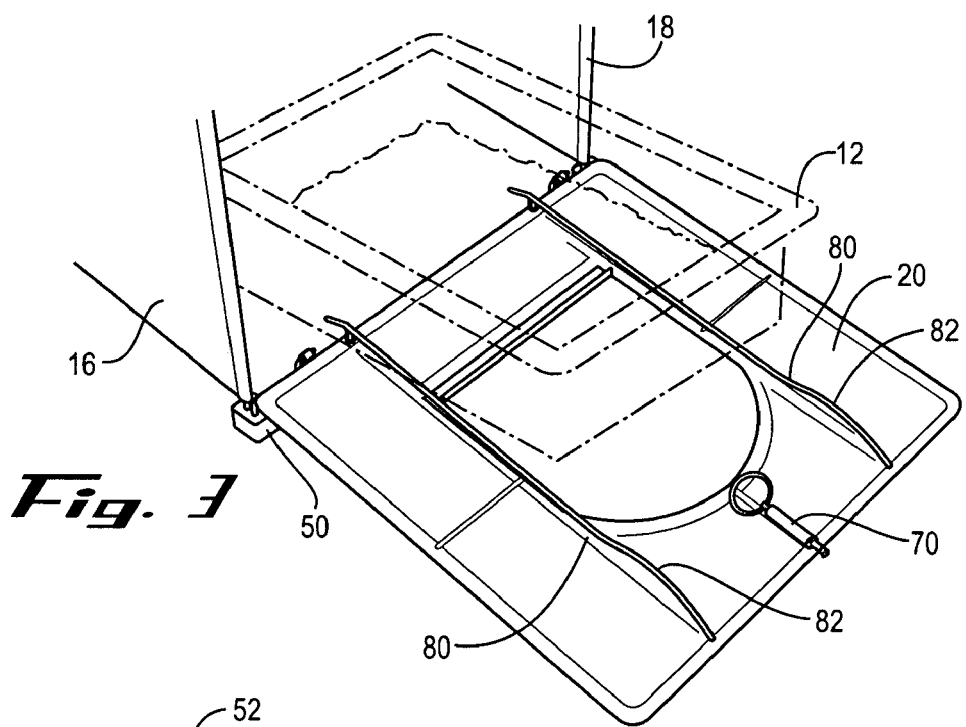
FIG. 3 shows a perspective view of a litter pan (in broken lines) sliding along support rails on the inside face of the door of the enclosure of FIG. 1, during removal and replacement.
Figure 4E:
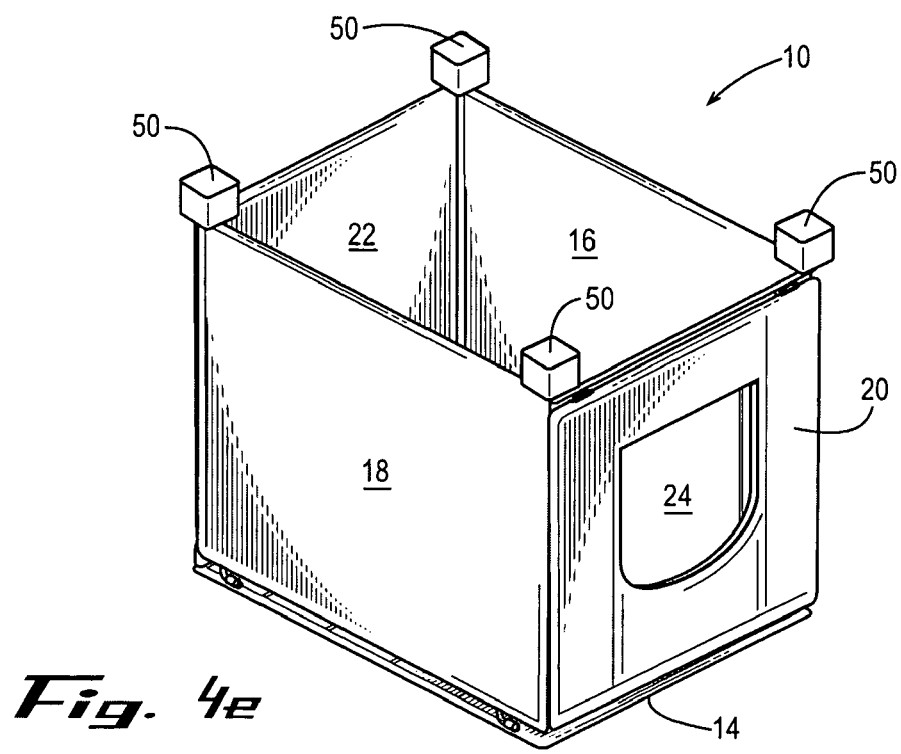

The front panel 20 preferably comprises a hinge bar 60 pivotally connected to the wire and weave portion of the panel 20 by one or more pin and ferrule couplings, hinges or other pivotal connectors 62. Posts 52 preferably extend from each end of the hinge bar 60 for attachment of the front panel to the remainder of the enclosure 10. With reference to FIGS. 2, 3 and 4d, the front panel 20 is attached by pressing a connector foot 50 onto a first post 52 of the front panel and a post 52 of the first side panel 16; and by pressing another connector foot 50 onto an opposite second post 52 of the front panel and a post 52 of the second side panel 18. A spring loaded latch 70, one or more magnetic coupling(s), and/or other releasable connector(s) is/are preferably provided at or adjacent the top of the front panel 20 for securing the front panel in its closed position, as shown in FIGS. 1 and 4e. The latch 70 is preferably mounted on the interior of the enclosure 10 for improved aesthetics and to prevent inadvertent opening thereof. Once the enclosure 10 is fully assembled as shown in FIG. 4e, it is flipped over so that the feet 50 rest on the floor or other supporting surface.

The front panel 20 preferably can be opened for access to the interior of the enclosure 10 for insertion and removal of the litter pan 12, as shown in FIG. 3. In alternate embodiments, one or more panels other than or in addition to the front panel 20, such as side panel(s) 16, 18, back panel 22, and/or top panel 14, are openable for access to the interior of the enclosure 10; or all of the panels are fixed and the litter pan 12 is accessed by lifting or sliding the enclosure 10 off of the litter pan. It has been found advantageous, however, to provide access to the interior by opening the front panel 20, as the area adjacent the front panel typically remains clear so the pet can readily enter the enclosure through the opening 24. Allowing for opening of the front panel 20 also facilitates training a pet to use the enclosure, by initially leaving the panel open and the litter pan extended partially outside of the enclosure 10, so that the pet can more easily see the pan. The pan can gradually be moved into the enclosure, and once the pet seems comfortable entering the enclosure to use the litter pan, the door can be closed and the pet will learn to enter and exit through the opening 24. In the depicted embodiment, the front panel 20 is opened by releasing the latch 70 from engagement with the top panel 14, and pivoting the front panel open about the hinge bar 60.

One or more rails 80 (two are depicted) are preferably provided along the interior face of the front panel 20, to support the litter pan 12 as it is removed from and replaced into the interior of the enclosure 10, as shown in FIG. 3. The ends of the rails 80 are preferably smoothly curved toward the panel 20, and the rails preferably have a smooth, low-friction surface, so that the litter pan 12 slides easily along the rails to facilitate easier removal and insertion, as for cleaning and replacement of litter in the litter pan. In addition to making the removal and replacement of the litter pan easier, the rails serve the further purpose of protecting the panel 20 from wear and damage due to repeated abrasion by the litter pan. The ends of the rails 80 toward the top edge of the panel 20 preferably comprise a ramp 82 or a stop for limiting the extent of sliding travel of the pan 12 and preventing inadvertent spilling of the contents of the pan. Upon replacement of the pan 12 back into the interior of the enclosure 10, the panel 20 is closed by pivoting it back to its upright position and re-engaging the latch 70. The latch 70 preferably is releasable with one hand, and re-engages automatically upon closing of the panel 20, without further manipulation.

While the invention has been described with reference to preferred and example embodiments, it will be understood by those skilled in the art that a variety of modifications, additions and deletions are within the scope of the invention, as defined by the following claims.

What is claimed is:

1. An enclosure for a pet litter pan comprising:
    a substantially rigid frame comprising a top panel, first and second side panels, a front panel and a back panel, forming an enclosure bounding an interior space for receiving a litter pan;
    a moisture-resistant plastic stranded material applied onto said frame; and
    wherein the front panel defines an access opening through the stranded material and the frame for permitting pet access to the interior space, and further comprising a hinged coupling adjacent a bottom edge of the front panel whereby the front panel can be pivotally opened to expose an interior face of the front panel; and
    further comprising a pair of rails extending above the interior face of the front panel, each rail having a first end adjacent the bottom edge of the front panel and a second end adjacent a top edge of the front panel, and each rail being positioned a distance away from the side edges of the front panel.

2. The enclosure of claim 1, wherein the top panel, the first and second side panels, the front panel and the back panel comprise generally flat panels assembled together.

3. The enclosure of claim 2, wherein the generally flat panels are rectangular and assembled in a box-like structure.

4. The enclosure of claim 2, wherein the box-like structure has an open bottom.

5. The enclosure of claim 2, wherein the panels are attached to one another by at least one pin and ferrule coupling.

6. The enclosure of claim 2, wherein the panels are attached to one another by at least one connector foot comprising a resilient block for supporting the enclosure on a floor and for engaging cooperating posts of the panels.

7. The enclosure of claim 6, further comprising a catch tray for resting a litter pan thereon.

8. The enclosure of claim 6, further comprising a removable catch tray having at least one notched corner for engagement with one of said at least one connector foot.

9. The enclosure of claim 1, further comprising a latch mounted on an interior face of the enclosure for locking the front panel in a closed position.

\* \* \* \* \*